M. B. MORGAN.
AUTOMOBILE.
APPLICATION FILED DEC. 10, 1910.

1,001,063.

Patented Aug. 22, 1911.

Witnesses

Inventor
Mathew B. Morgan
By Whittemore Hulbert & Whittemore
Attys

UNITED STATES PATENT OFFICE.

MATHEW B. MORGAN, OF DETROIT, MICHIGAN, ASSIGNOR TO CHALMERS MOTOR COMPANY, OF DETROIT, MICHIGAN, A CORPORATION OF MICHIGAN.

AUTOMOBILE.

1,001,063.　　　Specification of Letters Patent.　　Patented Aug. 22, 1911.

Application filed December 10, 1910. Serial No. 596,698.

*To all whom it may concern:*

Be it known that I, MATHEW B. MORGAN, a citizen of the United States of America, residing at Detroit, in the county of Wayne and State of Michigan, have invented certain new and useful Improvements in Automobiles, of which the following is a specification, reference being had therein to the accompanying drawings.

The invention relates to automobiles of the type wherein an inclosure is provided about the driver's seat, a familiar example being what is generally termed the "fore-door" style, and consists primarily in a construction wherein the usual control lever or levers may be located within the inclosure for convenient operation but without crowding the driver.

The invention further consists in certain details of construction, as will be more fully hereinafter set forth and claimed, and their peculiar arrangements and combinations.

Figure 1:
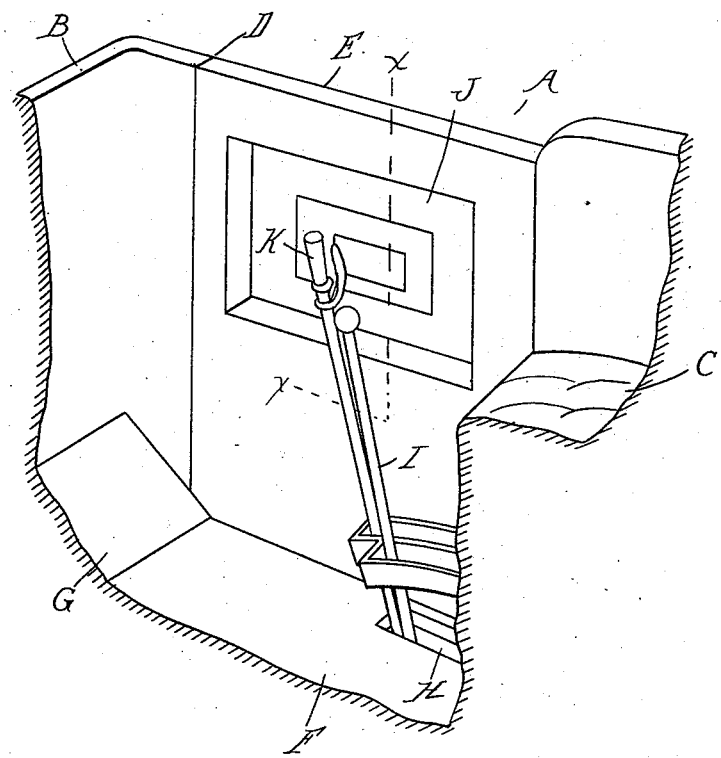
Figure 2:
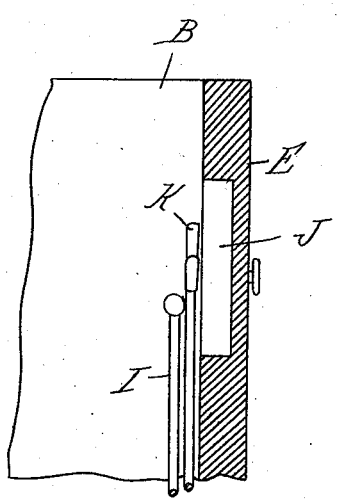

In the drawings, Figure 1 is a sectional perspective view of an automobile body of the "fore-door" type, illustrating the forward inclosure and the means for providing the operating space for the control lever; and Fig. 2 is a section taken on line *x—x* of Fig. 1.

In the drawings thus briefly described, A represents the car body, B the forward inclosure about the driver's seat, C, formed with a doorway D in its side portion and a door therefor E.

F is the usual flooring, including the footboard G, and H is an opening or slot in the flooring through which the control lever I extends, the lever being herein shown for the purpose of illustration as of the hand-controlled type.

To afford a maximum amount of space within the forward inclosure, I arrange the control lever preferably in as close proximity to the side wall of the inclosure as is possible, the slot through which the lever protrudes being shown as immediately adjacent thereto. The section of the inclosing wall opposite the lever is formed by the door E, and to provide a means for readily grasping and operating the lever notwithstanding its close proximity to the wall I form within the door a housing J opposite the handle section K or gripping portion of the lever, and extend the housing longitudinally for a distance equal to the travel of the lever in its operation. This housing as shown is formed by recessing the door on its inner side, the recess opening inwardly toward the lever and affording the necessary space for the hand of the operator to grasp and actuate the control member.

As thus constructed, the usual and necessary room is provided by the placement of the control mechanism at the side of the inclosure, and at the same time means are afforded for readily operating the lever notwithstanding its immediate proximity to the wall.

Attention is directed to the fact that "control lever" is used herein in its broad sense, the meaning being any lever that operates to control mechanism, whether it be the brake lever or what is usually termed control lever.

What I claim as my invention is,—

1. In an automobile, the combination of the forward body inclosure having a side wall provided with a recess or cut-away portion in its inner face, and an upwardly extending lever placed in immediate proximity to the side wall and having its gripping or handle portion directly opposite the recessed or cut-away portion of the side wall.

2. In an automobile, the combination of the forward body inclosure having a side door provided with a recess or cut-away portion in its inner face, and an upwardly extending lever placed in immediate proximity to the side wall and having its gripping or handle portion directly opposite the recessed or cut-away portion of the side wall.

In testimony whereof I affix my signature in presence of two witnesses.

MATHEW B. MORGAN.

Witnesses:
H. J. HUGKE,
J. N. BUCKLEY.